United States Patent [19]

Ondush et al.

[11] Patent Number: 4,755,118

[45] Date of Patent: Jul. 5, 1988

[54] EXTRUSION COOLER WITH ATMOSPHERE RECYCLE AND OPENABLE TOP

[75] Inventors: Andrew P. Ondush, Catasaqua; Roger A. Howells, Orefield, both of Pa.

[73] Assignee: Air Products and Chemicals, Inc., Allentown, Pa.

[21] Appl. No.: 74,200

[22] Filed: Jul. 16, 1987

[51] Int. Cl.$^4$ .............................................. B29C 47/88
[52] U.S. Cl. ........................................ 425/71; 62/373; 156/498; 264/28; 264/178 R; 264/562
[58] Field of Search ............... 425/71, 67, 378 R, 325; 264/28, 557, 562, 178 R, 209.1, 209.8; 156/80, 359, 149, 498, 244.13, 500; 62/1, 45, 63, 64, 222, 374, 373; 138/148

[56] References Cited

U.S. PATENT DOCUMENTS

| | | | |
|---|---|---|---|
| 598,550 | 2/1898 | Work | 264/28 X |
| 2,974,497 | 3/1961 | Carpenter et al. | 62/63 |
| 3,169,272 | 2/1965 | Maxson | 264/562 X |
| 3,473,194 | 10/1969 | Farrow | 425/71 |
| 3,538,210 | 11/1970 | Gatto | 425/71 X |
| 3,546,745 | 12/1970 | Ball | 425/71 |
| 3,584,108 | 6/1971 | Nelson et al. | 425/71 X |
| 3,645,656 | 2/1972 | Stauffer et al. | 425/71 |
| 3,804,567 | 4/1974 | Recknagel | 425/71 |
| 3,825,641 | 7/1974 | Barnett | 425/71 X |
| 3,871,185 | 3/1975 | Harper et al. | 62/63 |
| 3,953,270 | 4/1976 | Ford | 156/80 |
| 4,019,939 | 4/1977 | Barbier et al. | 156/149 X |
| 4,414,819 | 11/1983 | Contal et al. | 62/374 X |
| 4,452,752 | 6/1984 | Harder et al. | 264/557 X |
| 4,530,650 | 7/1985 | Milani | 425/325 X |
| 4,654,094 | 3/1987 | Ritter | 156/80 |
| 4,654,107 | 3/1987 | Ritter | 156/359 |

Primary Examiner—Richard L. Chiesa
Attorney, Agent, or Firm—James C. Simmons; William F. Marsh

[57] ABSTRACT

A cooling chamber for use in in-line association with a continuous extruder for rapidly cooling freshly extruded product, e.g. vinyl fluid hose, to prevent deformation of the fresh extrudate.

11 Claims, 2 Drawing Sheets

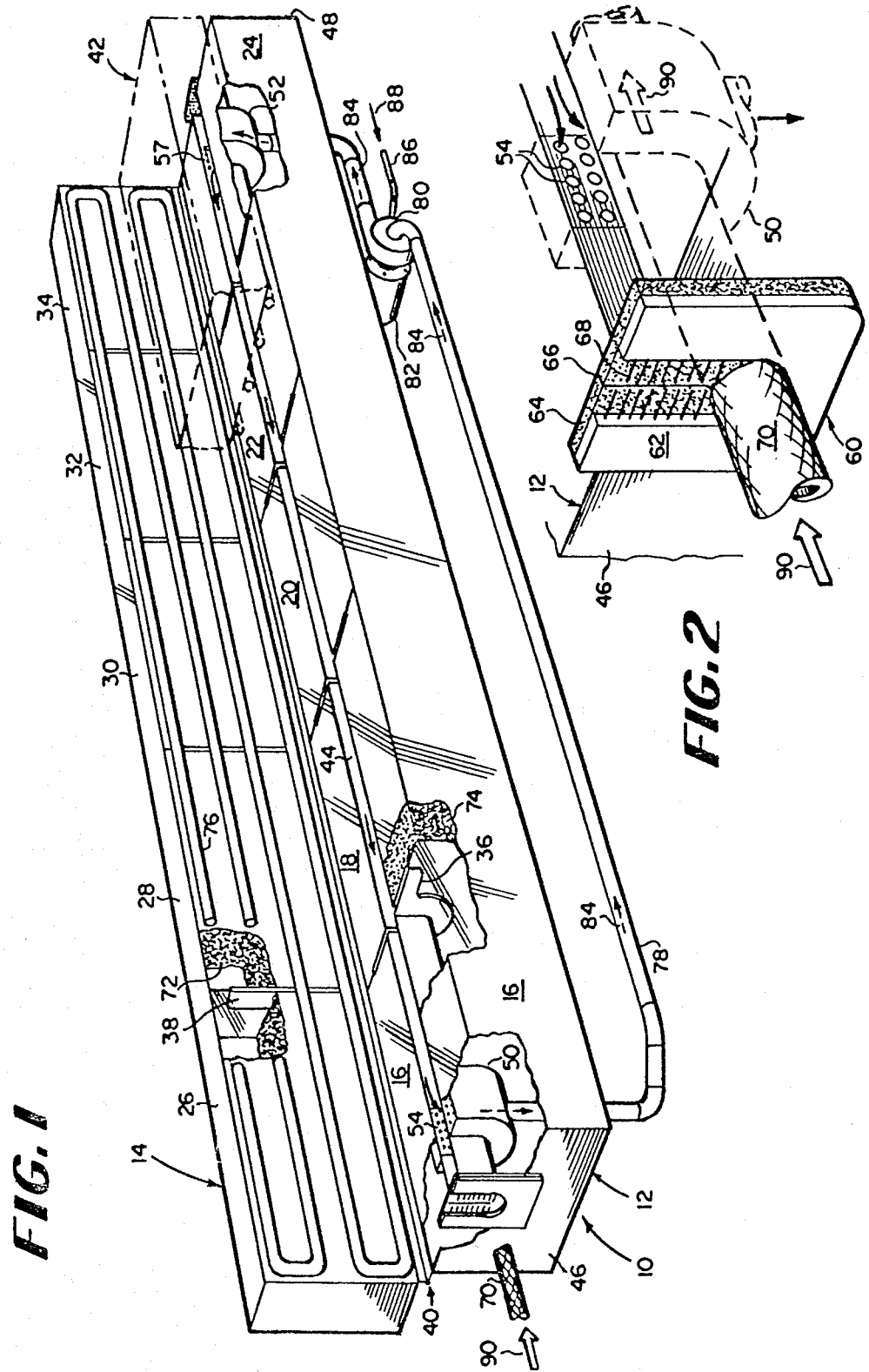

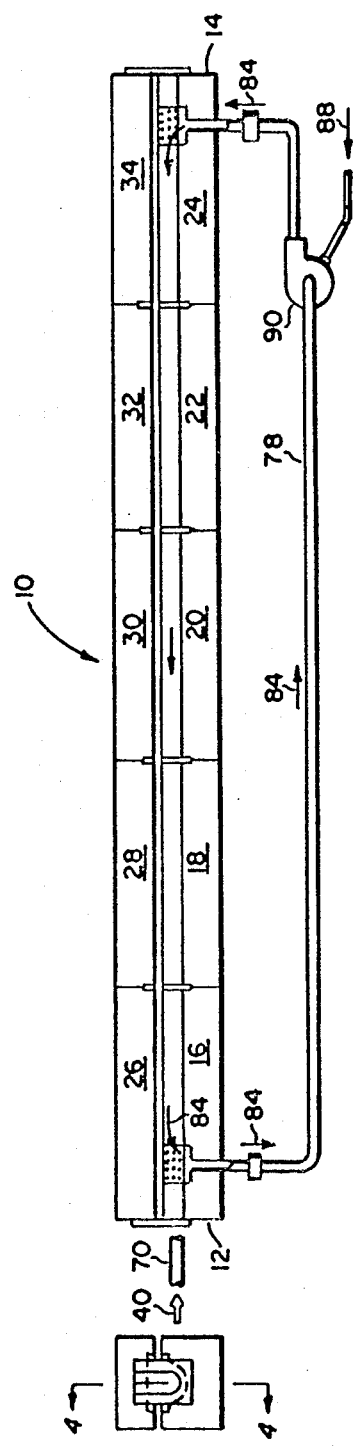

4,755,118

EXTRUSION COOLER WITH ATMOSPHERE RECYCLE AND OPENABLE TOP

TECHNICAL FIELD

The present invention relates to cryogenically cooling extrudate as it is formed.

BACKGROUND OF THE INVENTION

Certain continuously extruded products, e.g. vinyl fluid hose, must be cooled immediately after passing through the extrusion operation in order to prevent deformation. In the case of vinyl hose, because of the retained heat in the extruded product, the hose becomes susceptible to damage in handling which in turn leads to excessive rates of rejection of the manufactured or extruded hose. In conventional extrusion operations where the extruded material, be it hose, rod, bar or any other shape that would deform of its own weight if the temperature was not decreased rapidly after extrusion, cooling by immersing the extrudate in a water bath, which bath is placed downstream and as close as possible to the exit of the extrusion apparatus is utilized.

In the manufacture of braided hose which takes place by using a cooling step to cool the soft inner liner of the hose prior to braiding so that the inner liner is not deformed or the braid sinks into and becomes imbeded in the outer surface of the soft inner liner, a cryogenic cooling chamber such as disclosed in U.S. Pat. Nos. 4,654,107 or 4,654,094 is utilized. Both of the foregoing patent specifications and the discussion of the prior art therein are incorporated herein by reference. In utilization of a water cooling step following the extrusion, a problem results from the limitation on extrusion speed because of the fact that the water bath has a well defined heat transfer capability and thus can only cool the fresh extrudate in accordance therewith. Attempts have been made to increase the size of the bath and use associated refrigeration of the bath with little success in markedly increasing the extrusion speed.

The device of the '094 and '107 patents provides a more rapid method of cooling the extrudate except that direct contact of the cryogen, e.g. liquid nitrogen, on the extruded material results in uneven temperature gradients across the extrudate which in turn causes distortion and/or internal damage to the extrudate. Furthermore, such a device does not fully utilize both the liquid and gaseous refrigerant. Lastly, such a device relies upon material convection rather than mechanically forced convection and if the extrudate freezes, either due to its own material seizing to the tube, which is the central part of the chamber, or moisture freezes inside the chamber causing an ice buildup, the system is extremely difficult to clean and restart.

Furthermore, the water immersion process does not allow for speed increases necessary because water is carried along on the extrudate surface, thus the moisture may not evaporate entirely, causing defects in the final extruded product.

SUMMARY OF THE INVENTION

The apparatus of the present invention is an openable insulated chamber through which the fresh extrudate is drawn or pushed by the mechanics of the extrusion process. A cold cryogenic fluid, e.g. nitrogen gas, which may entrain some of the liquefied cryogen, is rapidly force circulated by mechanical means concurrently or countercurrently, depending upon the requirement of the process, around and past the fresh extrudate for the duration of the time the extrudate is in the chamber. Temperature and flow rate of the cryogen, cycled and recycled through the chamber, are controllable to obtain optimum rates for the material being extruded regardless of its size or shape. Unique seals are provided at the entrance and exit of the insulated chamber to permit exhausting of the warmed cryogen, which has provided its refrigerating capability to the extrudate, while retarding the ingress of air into the chamber.

BRIEF DESCRIPTION OF THE DRAWING

FIG. 1 is an isometric drawing of the apparatus according to the present invention with portions broken away to illustrate internal details thereof.

FIG. 2 is an enlarged fragmentary view illustrating the means of introducing cryogen into the chamber and the unique sealing means associated with the ends of the chamber.

FIG. 3 is an end view of the apparatus according to the present invention.

FIG. 4 is a view taken along the line 4—4 of FIG. 3.

DETAILED DESCRIPTION OF THE INVENTION

Referring to FIG. 1, the extrusion cooler (apparatus) 10 of the present invention comprises a first or bottom chamber portion (section) 12 and a second or top chamber portion (section) 14 which are made in the form of a plurality of longitudinally joined, generally hollow, rectangular sections 16, 18, 20, 22 and 24 as to the bottom 12 and 26, 28, 30, 32 and 34 as to the top 14. Between each of the longitudinally joined sections of the bottom 12 and the top 14 are expansion joints with compressible spacers such as shown as 36 between subsection 16 and 18 of bottom 12 and as 38 between subsections 26 and 28 of top 14. The bottom 12 and top 14 are joined together as by a longitudinal hinge 40 so that the bottom 12 and the top 14 can be brought in face to face relationship to form a chest. A portion 42 of the top 14 is shown in ghost lines illustrating the closure. The bottom 12 includes a longitudinal passage 44 which is open to the top face of bottom 12 juxtaposed to the bottom face of top 14 thus facilitating clearing of the passage 44. In one embodiment of the invention the longitudinal passage 44 is generally U-shaped and extends longitudinally through the bottom 12 with the open end of the U-shaped channel terminating in the upper surface (top face) of the bottom 12. Proximate the first or entry end 46 and the second or exit end 48 of the bottom 12 and surrounding and in fluid communication with U-shaped channel 44 are a first gas passage apparatus 50 and a second gas passage apparatus 52 in the form of generally U-shaped housings with gas passages 54 and 56, respectively.

Referring to FIG. 2, the gas passages 54 can comprise a plurality of apertures or holes in the inner wall of the U-shaped gas passage apparatus 50 so that a gas or fluid can be introduced into the U-shaped longitudinal passage 44 through the holes or apertures 54.

As also shown in FIG. 2 on the entry end 46 and on the discharge end 48 of the bottom 12, there is provided a gas sealing device or curtain shown generally as 60, comprising a face plate 62 to which is fastened or bonded a natural or synthetic felt pad 64. The felt pad contains a vertical parting line 66 and longitudinal parting lines 68 so that the felt material defines a plurality of finger-like extensions through which an extrudate 70 may pass to enter the U-shaped longitudinal passage 14. At the same time, the felt material 64 will permit gas inside the channel 44 to exit the chamber 10 while preventing ingress of ambient air into channel 44.

Referring back to FIG. 1, the top 14 and the bottom 12 are fabricated in portions which are generally rectangular boxes which can be filled with suitable cryogenic insulation material 72 and 74 for the top 14 and the bottom 12, respectively. In addition, an elongated gasket 76 having a generally circular cross-section is fixed to the top 12 on either side of the portion of the inner surface of top 12 that will be juxtaposed to the open end of the generally U-shaped channel 44 when the cooling apparatus is closed. The gasket 76 is made of a compressible material (e.g. reinforced Mylar ® sheath with stainless steel sponge interior) which when the two halves of the cooling apparatus 10 are juxtaposed to one another for operation of the cooling device and suitable locks (not shown) to hold the halves of the cooler 10 in operating position are activated, fluid in the channel 44 will not escape between the halves of the chamber 10.

Referring back to FIG. 1, disposed between the gas passage apparatus 50 and 52 is a gas recycle conduit 78 which has intermediate the gas passage apparatus 50 and 52 a suitable recycle blower 80 and its associated motor 82. Recycle blower 80 and conduit 78 are so constructed and arranged that flow through conduit 78 can be as shown by directional arrows 84 or in the reverse direction. Associated with blower 80 is an inlet conduit or injection port 86 so that a suitable cryogen can be introduced into the blower 80 from a source (not shown) in accordance with the directional arrow 88. Gas passage devices 50 and 52 serve as equalizing chambers so that pressure equalization of the cryogen can be effected as well as control of the cryogen flow. With the apparatus as shown in FIGS. 1 and 2, the extrudate 70 is conducted through the cooler 10 in the direction shown by arrows 90. The one flow path for the cryogen is shown schematically in FIGS. 3 and 4 where the cooling chamber 10 is shown in the operating mode. In the case of the operating set-up of FIGS. 3 and 4 wherein the extrudate 70 is passed through the chamber 10 as shown by the arrow 90, the cryogen 88 is introduced and circulated in a countercurrent fashion to the direction of travel of the extrudate 70. Under certain operating conditions it may be desirable to use co-current flow for the cryogen, and in that case the conduit 78 and the associated blower can be physically removed from the cooling chamber 10 and turned end for end to achieve concurrent circulation of the cryogen 88.

The apparatus of the present invention utilizes the "Wind Chill" caused by the rapid recycle of the cold gas 88 evolved from the injection of a liquefied gas (cryogen) in the recycle blower 80, the cooling rate of the extrusion 70 thereby being increased markedly. The increased cooling rate is due to both forced convection and to an enhanced boiling heat transfer from the cryogen.

The forced convection cooling heat transfer coefficient for fully developed turbulent flow of a single phase fluid in an annular passage is given by the equation:

$$h = 0.023 \frac{k}{De} Re^{0.8} Pr^{0.3}$$

wherein h=convective heat transfer coefficient (BTU/ft.$^2$-hour-°F.)
k=fluid thermal conductivity (BTU/ft.-hour-°F.)
De=equivalent diameter of annular passage (ft.)
Re=Reynold's number
Pr=Prandtl number.

The Reynold's number is directly proportional to the fluid velocity and the Prandtl number is a function of the fluid properties.

The prior art device as embodied by U.S. Pat. Nos. 4,654,094 and 4,654,107 did not have a mechanically-induced fluid flow but, rather, a simulated forced convection caused by the continuous injection of fairly small amounts of new cryogenic fluid. The device of the present apparatus should have a single phase convective cooling rate at least five times higher than the previous device because of the higher fluid velocity. In addition, the boiling heat transfer rate for the liquid phase is enhanced with forced convection in the apparatus of the present invention. This is a result of the change in boiling regimes because higher fluid velocities break down the vapor film as it trys to form around the hot material surface causing the boiling. This vapor film acts as an insulator to slow down heat transfer between the hot surface and the liquid. Thus, high velocity forced convection prevents the vapor film developing and continually provides cold fluid to contact the surface. Typical boiling curves would show that preventing vapor film formation can increase the heat transfer rate by at least one order of magnitude. Extrusion cooler 10 achieves enhanced heat transfer by the high flow recycle because of control of the flow rate and the temperature of the recycle, the shape of the fluid flow path, and the injection of the refrigerant into the recirculating fan at its point of highest rarification the latter parameter achieving high efficient utilization of the refrigerant capabilities.

A device according to the present invention was used to produce 1" diameter extruded PVC hose from an extruder that normally had a water bath associated on the discharge end of the extruder. Acceptable hose was fabricated on the existing equipment utilizing the water bath at a maximum production rate of 20 ft./min.

A cooling chamber according to the present invention was used in association with this extruder and tests were run at extrusions rates of 30 and 42 ft./min. The results of these tests are shown in Table I below:

TABLE I

| Production speed (FPM) | 30 | 42 |
| --- | --- | --- |
| Hose size | 1" | 1" |
| Hose Production (lbs) | 327 | 394 |
| Nitrogen Consumption (lbs) | 88 | 90 |
| Lbs Nitrogen/lbs Hoses | 0.269 | 0.228 |
| Gas Temperature (°F.) | 15–20 | −45 |
| Inside Hose Temperature (°F.) | 75 | 101 |
| Nitrogen Supply Pressure (psig) | 20 | 20 |
| Length of Test Run (minutes) | 60 | 30 |

Hose produced according to the tests set out in Table I was found to be satisfactory and without defects. The data of Table I was given an economic analysis with the results set forth in Table II below:

TABLE II

| Production Speed (FPM) | 30 | 42 |
| --- | --- | --- |
| Lbs Nitrogen/Lbs Hose | 0.269 | 0.228 |
| Cost per # of Hose ($/lb) | 0.010 | 0.009 |
| Cost per Foot of Hose ($/ft) | 0.0029 | 0.0026 |

| TABLE II-continued | | |
|---|---|---|
| Product Density (lbs/ft) | 0.18 | 0.31 |

From the results set forth in Table II it can be seen that at the higher production speed the nitrogen consumption and cost per foot of hose decreased so that there are economic incentives for utilizing the apparatus of the present invention.

The apparatus of the present invention can be used in association with many types of extruders and for various shapes of extrudate. As long as the extrudate can be conducted through the central passage of chamber 10. The device of the present invention could also be used to precool hose for subsequent braiding operations.

Having thus described our invention, what is desired to be secured by Letters Patent of the United States is set forth in the appended claims.

We claim:

1. An apparatus for rapidly cooling generally elongated extrudate comprising in combination:
   an elongated generally rectangular shaped first or bottom chamber portion having a continuous longitudinal passage therethrough, said passage partially opening on a top face of said bottom chamber;
   an elongated generally rectangular shaped second or top chamber portion having a shape complimentary to said bottom chamber portion and having a face portion adapted to removably close said longitudinal passage;
   a first gas passage spaced proximate a first end of said longitudinal passage and in fluid communication therewith;
   a second gas passage spaced proximate a second end of said longitudinal passage and in fluid communication therewith; fluid conduit means connecting said first and second gas passages;
   fluid circulation means to permit fluid to be circulated in any direction between said first and second gas passages using said longitudinal passage to complete a gas circulation loop; and
   means for introducing a cryogenic fluid into said gas circulation loop.

2. An apparatus according to claim 1 wherein said top and bottom chamber portions are fabricated as insulated sections joined longitudinally together with expansion joints therebetween.

3. An apparatus according to claim 1 wherein said top and bottom chamber portions are hingedly fixed to each other to define a chest type structure with suitable gasketing material between said portions when closed so that fluid introduced into the longitudinal passage will be directed along said passage.

4. An apparatus according to claim 3 including positive locking means to hold such top and bottom positions securely together when closed.

5. An apparatus according to claim 1 wherein said longitudinal passage is a generally U-shaped cross-section with said open end of said passage terminating in said top face of said bottom chamber portion.

6. An apparatus according to claim 1 wherein said first and second gas passages are formed as generally U-shaped collars communicating with said longitudinal passage through a plurality of apertures in inner walls of said collars.

7. An apparatus according to claim 1 wherein a major portion of said fluid conduit between said first and second gas passages extends outwardly of said bottom chamber portion.

8. An apparatus accordimg to claim 1 wherein said fluid circulation means includes a high speed fan or blower.

9. An apparatus according to claim 1 wherein said first and second ends of said longitudinal passage are closed by flexible curtains or wiper seals to prevent loss of circulating fluid.

10. An apparatus according to claim 9 wherein said first and second end wiper seals are fabricated from natural or synthetic felt having a plurality non-aligned finger-like portions disposed around a generally U-shaped opening in a backing plate, said U-shaped opening complimentary in shape to said U-shaped longitudinal passage.

11. An apparatus according to claim 1 wherein said means to introduce cryogenic fluid into said gas circulation loop includes an injection port in said fluid recirculation means.

* * * * *